US008618907B2

(12) United States Patent
Callentine et al.

(10) Patent No.: US 8,618,907 B2
(45) Date of Patent: Dec. 31, 2013

(54) METHOD AND APPARATUS FOR CODING IDENTIFICATION INFORMATION INTO A SECURITY TRANSMISSION AND METHOD AND APPARATUS FOR AUTOMATIC LEARNING OF REPLACEMENT SECURITY CODES

(75) Inventors: Donald Richard Callentine, Plainfield, IL (US); James Joseph Fitzgibbon, Batvia, IL (US); Eric Templeton, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1314 days.

(21) Appl. No.: 11/977,744

(22) Filed: Oct. 25, 2007

(65) Prior Publication Data

US 2009/0113541 A1 Apr. 30, 2009

(51) Int. Cl.
*G06F 7/04* (2006.01)

(52) U.S. Cl.
USPC ........ 340/5.26; 340/5.22; 340/5.23; 340/5.71

(58) Field of Classification Search
USPC ..................... 340/5.22, 5.23, 5.24, 5.26, 5.71
See application file for complete search history.

(56) References Cited

U.S. PATENT DOCUMENTS

| | | | | | |
|---|---|---|---|---|---|
| 4,558,175 | A | * | 12/1985 | Genest et al. | 713/185 |
| 4,992,785 | A | * | 2/1991 | Lewiner et al. | 340/5.27 |
| 5,422,632 | A | * | 6/1995 | Bucholtz et al. | 340/5.24 |
| 5,422,634 | A | * | 6/1995 | Okubo | 340/5.24 |
| 5,477,041 | A | * | 12/1995 | Miron et al. | 340/5.28 |
| 5,933,090 | A | * | 8/1999 | Christenson | 340/12.29 |
| 6,154,544 | A | | 11/2000 | Farris et al. | |

FOREIGN PATENT DOCUMENTS

WO WO 2005/086832 A2 * 9/2005

* cited by examiner

*Primary Examiner* — Edwin Holloway, III
(74) *Attorney, Agent, or Firm* — Fitch Even Tabin & Flannery LLP

(57) ABSTRACT

A method for use in relation to a security system includes receiving one or more items of information that each identify things or users associated with the security system, and forming a fixed portion of a security code using the one or more items of information. The fixed portion of the security code is stored in an apparatus that is configured to transmit the security code. A method and apparatus involving the receipt of such a security code are also disclosed. A method for use in relation to a security system includes generating a fixed portion of a security code, and setting a value of the fixed portion of the security code to a value that has a relationship to a fixed portion of a previously learned security code. The relationship indicates that the fixed portion of the security code is a replacement for the fixed portion of the previously learned security code. The fixed portion of the security code is stored in an apparatus that is configured to transmit the security code. A method and apparatus involving the receipt of such a security code are also disclosed.

46 Claims, 3 Drawing Sheets

METHOD AND APPARATUS FOR CODING IDENTIFICATION INFORMATION INTO A SECURITY TRANSMISSION AND METHOD AND APPARATUS FOR AUTOMATIC LEARNING OF REPLACEMENT SECURITY CODES

FIELD OF THE INVENTION

The present invention relates to security systems, such as barrier moving operators, and more particularly, to security (or access) codes used for activating such systems.

BACKGROUND

Different types of moveable barrier operators have been sold over the years and these barrier operator systems have been used to actuate various types of moveable barriers. For example, garage door operators have been used to move garage doors and gate operators have been used to open and close gates.

A barrier moving operator usually comprises a barrier moving unit, or opener, such as a controlled motor, and intelligent activation and safety devices. The opener is typically activated in response to a security (or access) code transmitted from a remote transmitter. Radio Frequency (RF) signaling is the most common means of transmitting the security codes.

Many barrier moving operators use codes to activate the system which change after each transmission. Such varying codes, called rolling codes, are created by the transmitter and acted on by the receiver, both of which operate in accordance with the same method to predict a next security code to be sent and received. Some known rolling type security codes also include one or more fixed portions in addition to the rolling code portion. The fixed portion(s) stays the same, while the rolling portion is a number that changes every transmission in order to confirm that the transmission is not a recorded transmission.

The use of moveable barrier operators is common in gated communities which may include several, dozens, or even hundreds of condominiums, houses, town homes, apartments, etc. Such gated communities typically include one or more main entrance gates to which each community member's remote transmitter provides access. Once inside the community, some or all of the individual homes may include their own garage door(s) and/or gate(s) to which the community member's remote transmitter will also provides access. An administrator of the community's home owner association (HOA) is typically responsible for coordinating the programming and distribution of the remote transmitters to the community members.

Unfortunately, the administration of such systems can present numerous challenges and problems. It is of course fundamentally important that the security provided by such systems be respected and maintained. On the other hand, denying access to an otherwise authorized party can lead to frustrations and difficulties as well. It can be difficult enough to accommodate such divergent needs and requirements when the system administrator has a well populated support staff; these problems can become worse, however, when cost restraints or the like lead to an increased need to rely upon automated administration systems or the like.

SUMMARY

One embodiment provides a method for use in relation to a security system, comprising: receiving one or more items of information that each identify things or users associated with the security system; forming a fixed portion of a security code using the one or more items of information; and storing the fixed portion of the security code in an apparatus that is configured to transmit the security code.

Another embodiment provides an apparatus for use in relation to a security system, comprising: a memory having a fixed portion of a security code stored therein, wherein the fixed portion of the security code is formed from one or more items of information that each identify things or users associated with the security system; and a transmitter operably coupled to the first memory and configured to transmit at least a part of the fixed portion of the security code.

Another embodiment provides a method for use in relation to a security system, comprising: receiving a transmitted code having a fixed portion, wherein the fixed portion of the transmitted code is formed from one or more items of information that each identify things or users associated with the security system; identifying a stored code having a fixed portion that matches the fixed portion of the transmitted code; and generating an authorization signal in response to the identification of a stored code having a fixed portion that matches the fixed portion of the transmitted code.

Another embodiment provides an apparatus for use in relation to a security system, comprising: a memory having one or more codes stored therein; a receiver configured to receive a transmitted code having a fixed portion, wherein the fixed portion of the transmitted code is formed from one or more items of information that each identify things or users associated with the security system; and a controller operably coupled to the memory and to the receiver and configured to identify a stored code having a fixed portion that matches the fixed portion of the transmitted code, and generate an authorization signal in response to the identification of a stored code having a fixed portion that matches the fixed portion of the transmitted code.

A better understanding of the features and advantages of various embodiments of the present invention will be obtained by reference to the following detailed description and accompanying drawings which set forth an illustrative embodiment in which principles of embodiments of the invention are utilized.

One embodiment provides a method for use in relation to a security system, comprising: generating a fixed portion of a security code; setting a value of the fixed portion of the security code to a value that has a relationship to a fixed portion of a previously learned security code, wherein the relationship indicates that the fixed portion of the security code is a replacement for the fixed portion of the previously learned security code; and storing the fixed portion of the security code in an apparatus that is configured to transmit the security code.

Another embodiment provides an apparatus for use in relation to a security system, comprising: a memory having a fixed portion of a security code stored therein, wherein the fixed portion of the security code has a value that has a relationship to a fixed portion of a previously learned security code, and wherein the relationship indicates that the fixed portion of the security code is a replacement for the fixed portion of the previously learned security code; and a transmitter operably coupled to the memory and configured to transmit at least a part of the fixed portion of the security code.

Another embodiment provides a method for use in relation to a security system, comprising: storing one or more codes; receiving a transmitted code having a fixed portion with the fixed portion including a first part and a second part; identifying a stored code having a fixed portion with a first part thereof that matches the first part of the fixed portion of the transmitted code; determining whether the fixed portion of the transmitted code is a replacement for the fixed portion of the stored code by comparing the second part of the fixed portion of the transmitted code with a second part of the fixed portion of the stored code; and storing a representation of the fixed portion of the transmitted code in response to the determination that the fixed portion of the transmitted code is a replacement for the fixed portion of the stored code.

Another embodiment provides an apparatus for use in relation to a security system, comprising: a memory having one or more codes stored therein; a receiver configured to receive a transmitted code having a fixed portion with the fixed portion including a first part and a second part; and a controller operably coupled to the memory and to the receiver and configured to identify a stored code having a fixed portion with a first part thereof that matches the first part of the fixed portion of the transmitted code, determine whether the fixed portion of the transmitted code is a replacement for the fixed portion of the stored code by comparing the second part of the fixed portion of the transmitted code with a second part of the fixed portion of the stored code, and store a representation of the fixed portion of the transmitted code in response to the determination that the fixed portion of the transmitted code is a replacement for the fixed portion of the stored code.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

Figure 1:
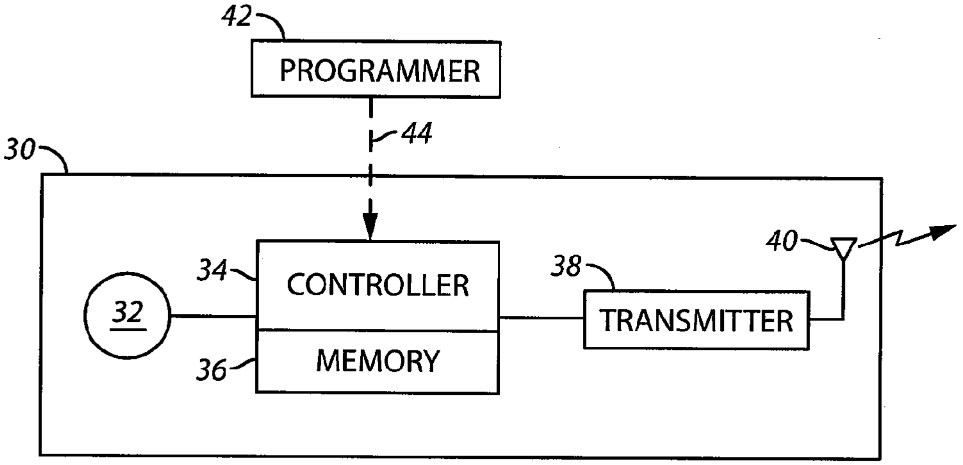
FIG. 1 is a schematic diagram illustrating remote transmitter and programmer devices that operate in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

As mentioned above, in a gated community the administrator of the home owner association (HOA) is typically responsible for coordinating the programming and distribution of the remote transmitters to the community members (e.g. homeowners, tenants, residents, etc.). Unfortunately, this can be an overwhelming and complex task in a community having hundreds of homes with new members moving in, members moving out, and remote transmitters constantly getting lost or stolen.

One method presently used by some associations is to have every transmitter which enters the gate have the same value for the fixed portion of the security (or access) code. One disadvantage of this approach, however, is that when a transmitter is lost or stolen all the transmitters for the association have to be re-coded. This is a major problem for the administrator of the association since he or she must contact every member and change each member's fixed value to a new value. When the association is hundreds of people the logistics are very difficult and the usual method is to leave the gate open until all the transmitters are changed, which defeats the gate's purpose.

Another method presently used by some associations is to have a block of transmitters having sequential values for the fixed portion of the security code, with each sequential value allowing access to the gate. The administrator of the transmitters keeps a log showing each member and the corresponding value for that member's transmitter. This way, if a transmitter is lost or stolen, the administrator can block (disable) the lost transmitter and give the person who owned the lost transmitter the next one in the administrator's pile of transmitters as a replacement. Disadvantages of this approach, however, include that the administrator has the burden of keeping the log of all the transmitters used, and when a transmitter is lost or stolen, the administrator must look it up in the log and then physically go to the receiver and block it. Gaining access to the receiver can be a problem when the barrier is a garage door. Either the administrator has to have access to everyone's garage, which is a security problem, or the administrator has to wait for the home owner to return home to gain access to do the recoding.

Additional disadvantages of this approach include that when all of the known transmitters are depleted the administrator must procure another block of codes. Furthermore, this system also reduces the security since the units are sequentially coded, which means an intelligent thief can discover a number of transmitter values that will allow access. Also reducing the security is the fact that any transmitter in the block of codes will activate the gate.

Some of the embodiments of the present invention provide a method of controlling automatic learning of a replacement remote transmitter, which provides a simple way for the administrator to replace a remote transmitter that is lost or stolen. For example, in some embodiments the administrator programs a replacement transmitter and then simply gives it to the member. The programming may be performed in a convenient location for the administrator, such as in the HOA office, or elsewhere. When the member uses the replacement transmitter for the first time a new or revised security code is automatically "learned" by the receiver and the old security code in the receiver is automatically erased. Because these actions occur automatically, the administrator is spared the burden of having to physically go the receiver to erase the old security code and place the unit in learn mode to learn a new security code. This ultimately may provide a better system for the association administrator and overcome one or more disadvantages of current systems.

Referring to FIG. 1, there is illustrated a remote transmitter 30 that operates in accordance with an embodiment of the present invention. In general, the remote transmitter 30 uses radio frequency (RF) transmitted security codes to control the position of a barrier such as a door, a gate, or a garage door. The present system may also be used to control a lock on a door, barrier, or the like.

The remote transmitter 30 includes one or more push buttons 32 which signal to a controller 34 that a security code is to be transmitted. The controller 34 assembles the security code by retrieving a fixed code portion from a transmitter memory 36 and adding a rolling code portion. The controller 34 then controls a transmitter 38 to send the security code. Radio frequency signals that carry the security code are launched into the airwaves via an antenna 40.

Figure 2:
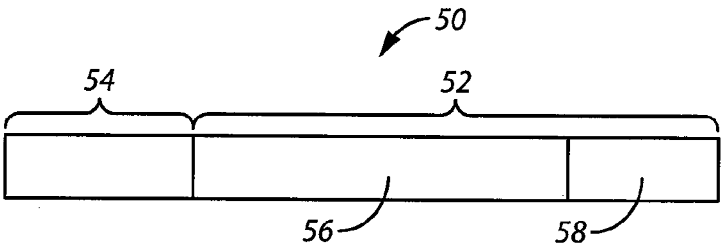
FIG. 2 is a timing type diagram illustrating a security code assembled in accordance with an embodiment of the present invention.

Referring to FIG. 2, there is illustrated an example of a security code 50 that is transmitted by the remote transmitter 30. The security code 50 includes a fixed portion 52 and a rolling portion 54. In accordance with an embodiment of the present invention, the fixed portion 52 has a value that has a relationship to the fixed portion of a security code that was previously "learned" by a corresponding barrier movement operator. This relationship may signify to the barrier movement operator that the fixed portion 52 of the transmitted security code 50 is a replacement for the fixed portion of the previously learned security code. That is, in some embodiments this relationship signifies to the barrier movement operator that the value of the fixed portion 52 of the transmitted security code 50 should be overwritten into the location of the fixed portion of the previously learned security code. In this way the barrier movement operator automatically "learns" the new value of the fixed portion 52 and automatically removes the old value for fixed portion of the previously learned security code. Thus, the administrator does not have to physically go to the barrier movement operator to program it because the system described herein controls automatic learning of the replacement remote transmitter.

In some embodiments, the relationship between the value of the fixed portion 52 of the transmitted security code 50 and the value of the fixed portion of the previously learned security code is such that it signifies to the barrier movement operator that the values for all previously learned security codes should be erased before learning the new value. This feature may be used by the administrator for the scenario where an entire family that utilized several remote transmitters (and thus several different security codes) moves out of the community and a new member moves into the same house. By simply giving the new remote transmitter to the new member, all of the previous family's security codes are automatically erased and the new value is learned the first time the new member uses the transmitter.

The fixed portion 52 of the transmitted security code 50 may be generated by a programmer 42 (FIG. 1). In general, the programmer 42 may be used to program (or re-program) the remote transmitter 30. For example, when a new family moves into a gated community the administrator may use the programmer 42 to generate one or more new transmitters for use by members of the family. The administrator couples the remote transmitter 30 to the programmer 42 via a wired or wireless connection 44. Operation of the programmer 42 results in the generation of the fixed portion 52 (FIG. 2) of the security code 50 having the above-described relationship to a previously learned code. The fixed portion 52 is then stored in the transmitter memory 36 (FIG. 1). By way of example, the programmer 42 may comprise a computer, such as a personal computer (PC) or notebook computer, running program code that implements the techniques described herein for generation of the fixed portion of a security code having the above-described relationship to a previously learned code.

During its operation, the programmer 42 may prompt the administrator or other user to enter certain information. In some embodiments of the present invention, the user is prompted to enter information regarding whether or not the value of the fixed portion of one or more previously learned security codes in the barrier movement operator should be erased. For example, in some embodiments the user is prompted to designate whether the remote transmitter being programmed is a replacement without erase, a replacement with erase, or a replacement with full erase. A replacement without erase means that no codes in the receiver will be erased. A replacement with erase means that only the fixed portion of the one corresponding security code will be erased. And a replacement with full erase means that the fixed portions of all previously learned security codes in the receiver will be erased as described above. In response to the user's designation, the programmer 42 will generate the fixed portion of the security code with an appropriate value that will signify the user's requested erase instructions to the receiver.

Figure 3:
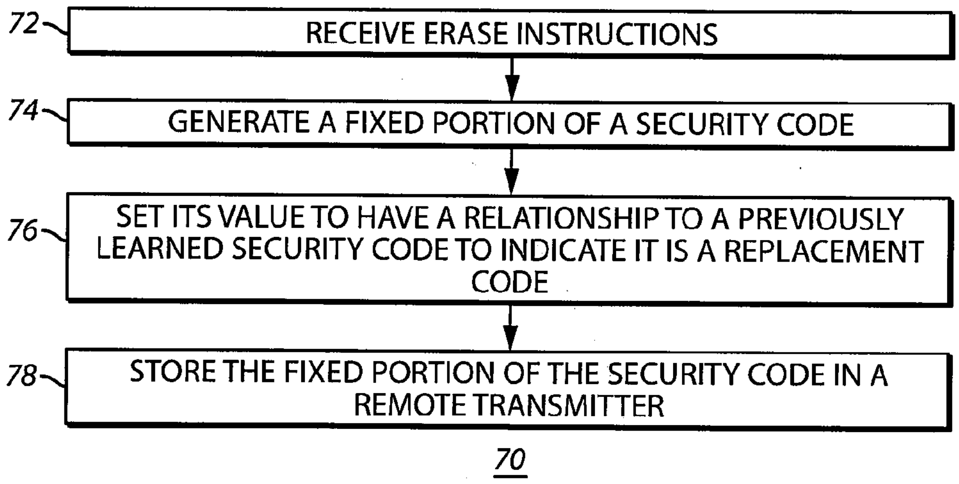
FIG. 3 is a flow diagram illustrating a method for use by the programmer device shown in FIG. 1 in accordance with an embodiment of the present invention.

An example of a process flow that may be used by the programmer 42 in some embodiments is illustrated in FIG. 3. The illustrated flow chart 70 begins with step 72 in which a user's erase instructions for previously learned security codes are received. Then, in step 74, a fixed portion of a security code is generated. In step 76, a value of the fixed portion of the security code is set to a value that has a relationship to a fixed portion of a previously learned security code. As described above, the relationship may indicate that the fixed portion of the security code is a replacement for the fixed portion of the previously learned security code. Furthermore, the value that is set for the fixed portion of the security code may also reflect the user's requested erase instructions for previously learned security codes. Finally, in step 78, the fixed portion of the security code is stored in an apparatus that is configured to transmit the security code, such as a remote transmitter.

In some embodiments, the above-described relationship between the fixed portion 52 (FIG. 2) of the security code 50 and a previously learned security code may be implemented by having the fixed portion 52 include a first part 56 and a second part 58. The relationship is created by having the value of the first part 56 be equal to the value of a corresponding first part of the fixed portion of the previously learned security code. In some embodiments, the first part 56 may comprise any type of fixed code, such as for example a random fixed code, a code identifying a user, place or thing, or some other fixed code. An optional technique for generating the value of the first part 56 will be discussed below.

The second part 58 of the fixed portion 52 of the security code 50 is used to hold a transmitter version value. The transmitter version value in the second part 58 is used to indicate whether the fixed portion 52 should be stored in the barrier movement operator as a replacement for a previously learned code. Namely, when the first part 56 matches the corresponding first part of a code stored in the barrier movement operator, the transmitter version value in the second part 58 is examined to determine whether it indicates that the fixed portion 52 is a new version of the previously learned code. If so, then the stored part of the previously learned code is replaced with the fixed portion 52.

Thus, a version value in the fixed code portion is changed in order to automatically update the barrier movement operator on the first receipt of the code. That is, upon the first receipt of a previously learned fixed code portion having a new version value, the barrier movement operator automatically updates the previously learned fixed code portion to the received fixed code portion.

In some embodiments, the transmitter version value in the second part 58 is automatically generated by the programmer 42 (FIG. 1). As mentioned above, the programmer 42 may prompt the administrator or other user to indicate whether the transmitter is a replacement without erase, a replacement with erase, or a replacement with full erase. When the transmitter is requested as a replacement with erase, the value of the first part 56 (FIG. 2) of the fixed portion 52 of the transmitted code 50 is made equal to the corresponding first part of the previously learned code that is to be replaced. Then, the transmitter version value in the second part 58 is changed, such as by incrementing it, during the programming. The incremented transmitter version value will indicate to the barrier movement operator that the transmission should be handled as a replacement with erase. By way of example, the transmitter version value may comprise a simple number, such as for example 1, 2, 3, 4, 5, 6, 7, 8, etc., or some other number.

When the transmitter is requested as a replacement with full erase, the value of the first part 56 of the fixed portion 52 of the security code 50 is also made equal to the first part of the previously learned code that is to be replaced. Then, the transmitter version value in the second part 58 is changed to indicate a full erase. By way of example, another one or more bits in the second part 58 may be used to indicate a replacement with full erase. The setting of such bit(s) will indicate to the barrier movement operator to erase all codes except the newly stored value from the fixed portion 52 of the security code 50.

When the transmitter is requested as a replacement without erase, the value of the first part 56 of the fixed portion 52 of the security code 50 is made equal to the corresponding first part of the previously learned code that is to be replaced. In this case, however, the transmitter version value in the second part 58 is not changed or incremented. Instead, it is made equal the corresponding second part of the previously learned code that is to be replaced. This means that the value of the fixed portion of the code in the new transmitter will be exactly the same as the value of the code in the transmitter being replaced. The unchanged transmitter version value will indicate to the barrier movement operator that the previously stored code should not be erased. There is no reason to erase it when the fixed portion of the new code in the new transmitter is exactly the same. This option may be acceptable for the scenario where the transmitter being replaced has been destroyed or it is otherwise certain that it cannot be used by a thief, intruder, or other unauthorized person.

Once the fixed portion 52 of the security code 50 is generated, the rolling portion 54 is added or combined with the fixed portion 52 and the security code 50 is transmitted by the remote transmitter 30 (FIG. 1). The rolling portion 54 may be added or combined, and the security code 50 transmitted, in accordance with the teachings of U.S. Pat. No. 6,154,544 to Farris et al. entitled "Rolling Code Security System," the entire contents of which are hereby fully incorporated herein by reference in their entirety.

Figure 4:
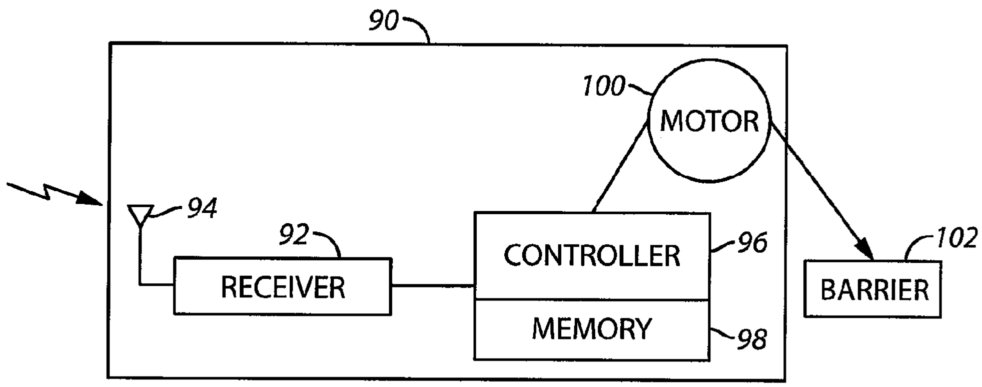
FIG. 4 is a schematic diagram illustrating a barrier movement operator that operates in accordance with an embodiment of the present invention.

After the security code 50 is transmitted by the remote transmitter 30, it is received by a barrier movement operator. Referring to FIG. 4, there is illustrated a barrier movement operator 90 that operates in accordance with an embodiment of the present invention. The barrier movement operator 90 includes an RF receiver 92 which receives RF security code transmissions via an antenna arrangement 94. In the present embodiment each transmission includes data identifying the security code, or portion thereof, and information such as a start and sync character to synchronize the receiver 92 with the incoming message. The receiver 92 detects the synchronizing information and the security code portion, which is forwarded to a controller 96. The data in a transmission may include a number of digits or digit portions which are sequentially conveyed by the receiver 92 to the controller 96.

The controller 96 receives the digits and digit portions from the receiver 92 and analyzes them to determine from the received format whether a security code portion is in fact being received. The controller 96 then continues to accumulate the digits of a received security code. A received security code is then compared with one or more approved security codes which are stored in a memory 98 to determine whether approval should be given to the received security code. If such approval is given a motor 100 is energized to move a barrier 102 in a manner determined by the controller 96. In some embodiments, other actions such as unlocking a barrier may also be initiated by the controller 96.

In accordance with an embodiment of the present invention, the controller 96 also analyzes the received security code to determine whether or not the value of the fixed portion thereof is a replacement for the fixed portion of one of the security codes stored in the memory 98. This analysis is accomplished by determining whether the value of the fixed portion of the received security code has the above-described relationship to the fixed portion of one of the security codes stored in the memory 98. As described above, such a relationship may signify to the barrier movement operator 90 that the value of the fixed portion of the transmitted security code should be overwritten into the location of the fixed portion of the previously learned security code. This automatic "learning" of the new value and automatic removing of the old value may be used for accomplishing the task of replacing a lost remote transmitter.

Figure 5:
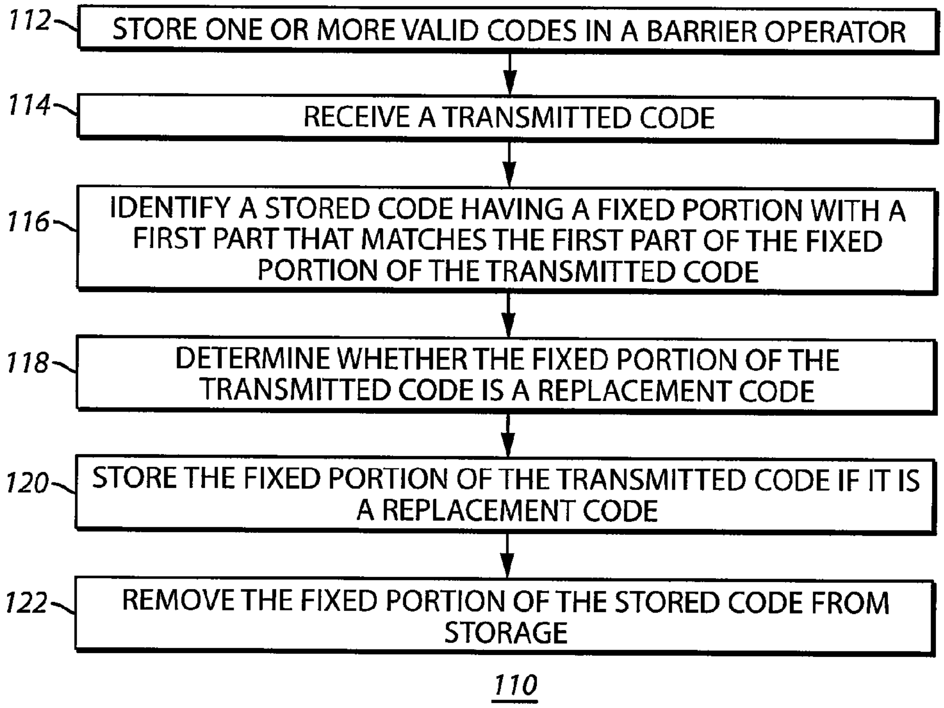
FIG. 5 is a flow diagram illustrating a method for use by the barrier movement operator shown in FIG. 4 in accordance with an embodiment of the present invention.

An example of a process flow that may be used by the barrier movement operator 90 in some embodiments is illustrated in FIG. 5. The illustrated flow chart 110 begins with step 112 in which one or more valid security codes are stored in, or "learned" by, a barrier movement operator. Such stored codes may comprise all the valid codes for the members of a gated community or the members of a family. Next, in step 114, a transmitted code is received. In this example, it will be assumed that the above-described relationship between the transmitted code and a previously learned code is implemented by the codes having fixed portions that include a first part and a second part. In step 116, a stored code is identified in the barrier movement operator that has a fixed portion with a first part that matches the first part of the fixed portion of the transmitted code.

In step 118, it is determined whether the fixed portion of the transmitted code is a replacement for the fixed portion of the identified stored code. This determination may be made by comparing the second part of the fixed portion of the transmitted code with a second part of the fixed portion of the identified stored code. Stated differently, the version values of the two fixed code portions are compared. If it is found that the transmitted code includes a changed version value such that it is a replacement code, then the comparison may further involve deciphering any included erase instructions for the previously learned security codes. Then in step 120, a representation of the fixed portion of the transmitted code is stored, or "learned," in response to the determination that the fixed portion of the transmitted code is a replacement code. And finally, in step 122 the fixed portion of the identified stored code, or previously "learned" code, is removed from storage if any included erase instructions indicated that the replacement was with erase or with full erase. The removing of the code from storage may be accomplished by erasing it or overwriting it with the replacement code. If any included erase instructions indicated that the replacement was with full erase, then all of the previously learned codes would be erased (with the exception of the newly learned code).

Thus, upon the first receipt of a previously learned (or stored) fixed code portion having a new version value, the barrier movement operator automatically updates the previously learned fixed code portion to the received fixed code portion.

Figure 6:
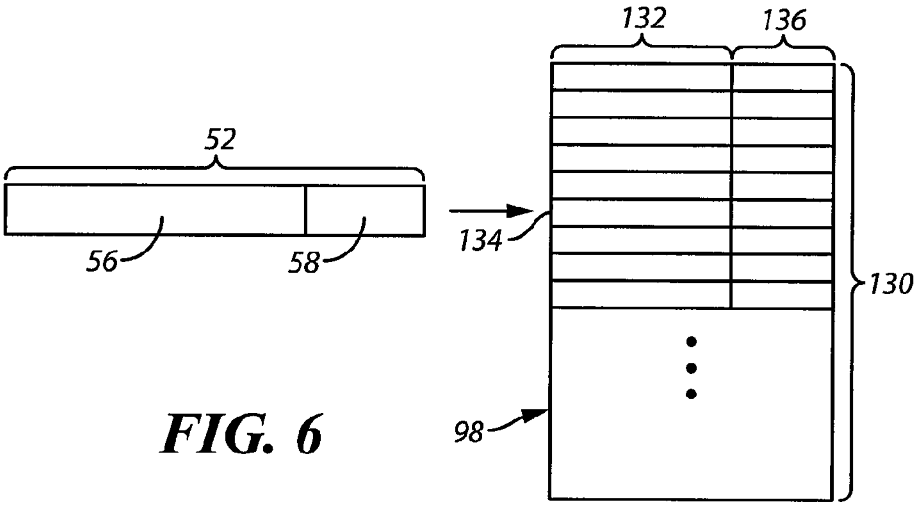
FIG. 6 is a schematic diagram illustrating more detail with respect to some of the components illustrated in FIG. 4.

An example application of the method shown in the flow chart 110 is illustrated in FIG. 6. Shown are the fixed portion 52 of the transmitted security code 50 and the memory 98 of the barrier movement operator 90. The memory 98 includes one or more valid security codes 130 stored therein. The transmitted security code 50, the fixed portion 52 of which includes a first part 56 and a second part 58, is received by the barrier movement operator 90.

The first part 56 of the fixed portion 52 is compared to the corresponding first parts 132 of the stored (or previously learned) security codes 130 that are stored in the memory 98. This comparison is performed in order to identify a stored code having a first part 132 that matches the first part 56 of the fixed portion 52 of the transmitted security code 50. In this example it will be assumed that the stored code 134 is identified as having a matching first part.

Then, the second part 58 of the fixed portion 52 of the transmitted security code 50 is compared to the second part 136 of the identified stored code 134 to determine whether the fixed portion 52 is a replacement for the identified stored code 134. If so, the second part 58 is also examined to determine whether the replacement is without erase, with erase, or with full erase.

If it is determined that the fixed portion 52 of the transmitted security code 50 is a replacement with erase for the fixed portion of the identified stored code 134, then at least a representation of the fixed portion 52 is stored in the memory 98. Furthermore, the fixed portion of the previously learned stored code 134 is removed from storage either by being erased or by being overwritten by the representation of the fixed portion 52 of the transmitted security code 50. If it is determined that the fixed portion 52 of the transmitted security code 50 is a replacement with full erase, then the fixed portions of all of the other previously learned stored codes 130 are also removed from storage by being erased (with the exception of the newly stored fixed portion 52).

If it is determined that the fixed portion 52 of the transmitted security code 50 is a replacement without erase for the identified stored code 134, then no codes are stored or removed. This is because the value of the fixed portion 52 of the code in the replacement remote transmitter is the same as the value of the fixed portion of the identified stored code 134 being replaced.

Thus, the above-described techniques provide a method of programming a replacement remote transmitter so that when it is used the new or revised security code is automatically learned by the barrier movement operator and specific locations in the memory are automatically erased. For example, as described when a barrier movement operator receives a code with an incremented version value for one of its previously learned codes, the barrier movement operator knows to erase the old code or simply to overwrite the value. This eliminates the need for the administrator to physically go to the barrier movement operator to reprogram it.

Some embodiments of the present invention provide an optional technique for coding identification (ID) information into the transmission. In general, the technique involves generating a value for the fixed portion of a security code that includes ID information. The technique may be used to generate a value for the fixed portion of a security code that either includes, or does not include, the above-described relationship to a previously learned code.

Figure 7:
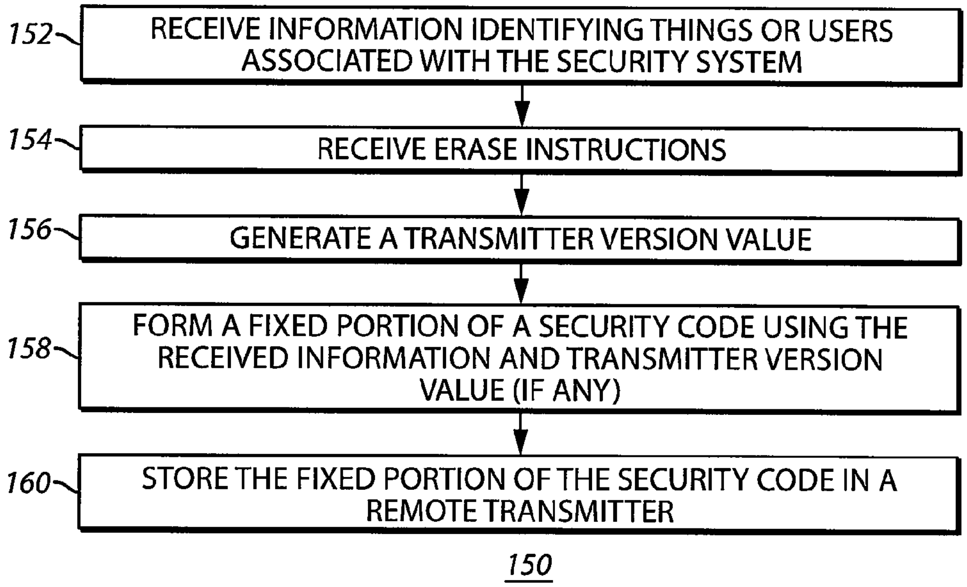
FIG. 7 is a flow diagram illustrating a method for use by the programmer device shown in FIG. 1 in accordance with an embodiment of the present invention.

In some embodiments, the programmer 42 (FIG. 1) may be configured to generate the fixed portion of a security code having ID information included therein. An example of a process flow that may be used by the programmer 42 is illustrated in FIG. 7. The illustrated flow chart 150 begins with step 152 in which one or more items of information that each identify things or users associated with the security system are received by the programmer. These items of information are typically received from an administrator operating the programmer.

For example, when the administrator needs to program a new remote transmitter, such as for a new family moving into the community, the administrator enters characterization or other identifying information into the programmer. By way of example, the information may include a house ID, street ID, vehicle ID, user ID, garage door ID, user's initials, user's birthday etc., associated with the security system. Each ID may be a simple number. As one example, the following IDs may be used: street ID (1=Main St., 2=Maple St., 3=Grape St., 4=State St. . . . ); user ID (1=dad, 2=mom, 3=daughter, 4=son . . . ); vehicle ID (1=sedan, 2=SUV . . . ). Additional examples include that the items of information may relate to one or more of a structure, building, location, community, address, street, vehicle, user, and/or door associated with the security system. Thus, the items of information that are received by the programmer may include any items of information that identify any things or users associated with the security system.

As mentioned above, the present technique may be used to generate a value for the fixed portion of a security code that either includes, or does not include, the above-described relationship to a previously learned code. If such a relationship is to be included, then optional steps 154 and 156 may be executed by the programmer. Specifically, in optional step 154, the programmer receives erase instructions from the administrator. As described above, the erase instructions may indicate whether the transmitter is a replacement without erase, a replacement with erase, or a replacement with full erase. Then, in optional step 156, the programmer automatically generates the transmitter version value based on the received erase instructions. As described above, the transmitter version value may be used for determining whether the fixed portion of the security code is a replacement for a fixed portion of a code stored in a barrier movement operator.

In step 158, a fixed portion of a security code is formed using the received one or more items of information and the transmitter version value (if any). The fixed portion of the code may be formed by combing the received items of information and the transmitter version value (if any). By combining all the information to form the fixed portion of the security code, the identification information is coded into the transmission. The combining may be done in any way. For example, in some embodiments the items are combined at the programmer by an encryption method. That is, the items are encrypted into a fixed code value. Each programmer device may have a unique type of encryption to further enhance security. This may be implemented by having each programmer device use a unique encryption key. With such an implementation, the programmer devices may be common devices with only the encryption keys being different. Thus, different gated communities can use the same programmer devices but with different encryption keys.

Finally, in step 160, the fixed portion of the security code is stored in an apparatus that is configured to transmit a security code, such as a remote transmitter device.

Figure 8:
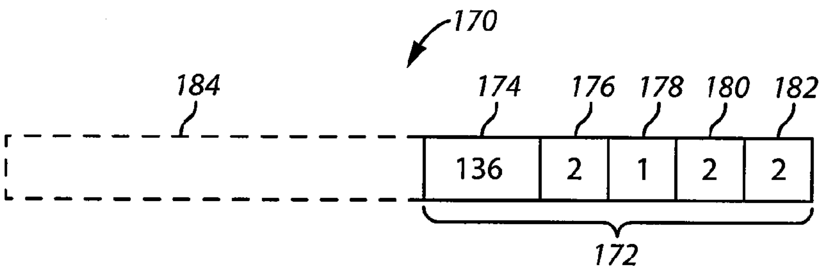
FIG. 8 is a timing type diagram illustrating a security code assembled in accordance with an embodiment of the present invention.

An example application of the method shown in the flow chart 150 is illustrated in FIG. 8. Specifically, a security code 170 is illustrated that includes a fixed portion 172. The fixed portion 172 has been formed by using several items of information that each identify things or users associated with the security system. For example, the items of information include a house number 174, street ID 176, user ID 178, and a garage door ID 180. In this example, the house number 174 is set equal to "136", which may be the actual address or just an identifying number for the house for which this remote transmitter is being programmed. The street ID 176 is set equal to "2", which may correspond to Maple Street. The user ID 178 is set equal to "1", which may correspond to the father in the household. And the garage door ID 180 is set equal to "2", which may correspond to the second garage door at the house. Again, any type of information, such as building, dwelling, owner, vehicle or personal information, may be incorporated into the fixed portion 172 of the security code.

In addition, a transmitter version value 182 is also included. In this example, the transmitter version value 182 has been incremented by the programmer from "1" to "2". This indicates that the remote transmitter is a replacement with erase. Again, the transmitter version value may comprise any type of number or indication, such as for example 1, 2, 3, 4, 5, 6, 7, 8 . . . . As mentioned above, the inclusion of a transmitter version value is optional.

The fixed portion 172 is formed by combining all of the information. That is, the house number 174, street ID 176, user ID 178, garage door ID 180, as well as the transmitter version value 182, are combined together. The items of information may be combined in an orderly manner as shown, or they may be combined in some other manner. For example, combining the items in a unique manner known only to a few may enhance security. It is believed that security will be further enhanced if the data making up the items of information is scrambled or encrypted, as mentioned above. That is, all of the items of information, as well as the transmitter version value, may be combined at the programmer by an encryption method to encode all of the information into the transmission. Where the encoding of the characteristic information is encrypted, the information is believed to be more secure. Of course, once the information is encrypted, it will not appear as orderly as it does in FIG. 8.

In some embodiments, a rolling code portion 184 is eventually added or combined with the fixed code portion 172 to implement a rolling code transmission. The rolling code portion 184 may be added or combined with the fixed code portion 172 in accordance with the teachings of the aforementioned U.S. Pat. No. 6,154,544, incorporated herein by reference. The rolling portion 184 may be generated by the remote transmitter, or the rolling portion 184 may be generated by the programmer device and then stored in the remote transmitter. In addition, the rolling code portion 184 may be encrypted along with the fixed code portion 172, or it may be encrypted separately, or it may not be encrypted.

Generating a fixed code portion using the above-described type of ID information results in a predictable fixed code, which makes the codes easier for an HOA administrator to manage. For example, programming a remote transmitter so that the above-described type of ID information is included in the fixed portion of the security code means that the transmitter can be related to the user, dwelling, etc. This makes loss and replacement identification easier because the transmitter's security code value is known to the association's administrator without having to look it up. Namely, if a remote transmitter is found, the security code that is stored in the transmitter can be read to obtain the ID information. The characteristics of the ID information may be used to identify the person to which the transmitter should be returned. In some embodiments, the programmer device may be configured to read and decipher the ID information from the remote transmitter.

While the invention herein disclosed has been described by means of specific embodiments and applications thereof, numerous modifications and variations could be made thereto by those skilled in the art without departing from the scope of the invention set forth in the claims.

What is claimed is:

1. A method for use in relation to a security system, the method comprising:

receiving one or more items of information that individually identify things or users associated with the security system;

forming a fixed portion of a security code using the one or more items of information, wherein the security code is configured to effect access to a secured area;

storing the fixed portion of the security code in an apparatus that is configured to transmit the security code;

forming a varying portion of the security code in response to an assertion of a user interface of the apparatus; and transmitting the varying portion and the fixed portion of the security code to a receiving apparatus, wherein the varying portion of the security code is configured to be used by the receiving apparatus to determine whether to effect operation of the receiving apparatus, and further wherein at least a portion of the fixed portion of the security code is configured to effect at least two different replacement decisions at the receiving apparatus based on a form of the at least a portion of the fixed portion of the security code, wherein a first form of the at least a portion of the fixed portion of the security code is configured to effect the receiving apparatus to add the fixed portion to a learned list of fixed portions corresponding to authorized transmitters, and wherein a second form of the at least a portion of the fixed portion of the security code is configured to effect the receiving apparatus to add the fixed portion to the learned list of fixed portions corresponding to authorized transmitters while erasing a corresponding previously learned fixed portion.

2. The method of claim 1, wherein the one or more items of information each comprise information related to one or more of a structure, building, location, community, address, street, vehicle, user, and door associated with the security system.

3. The method of claim 1, wherein the receiving one or more items of information includes receiving two or more items of information and the forming a fixed portion of a security code comprises:

combining the two or more items of information.

4. The method of claim 1, wherein the forming a fixed portion of a security code comprises:

encrypting the one or more items of information.

5. The method of claim 1, wherein the variable portion of the security code comprises a rolling portion of the security code.

6. The method of claim 1, further comprising:

generating a version value for use in determining whether the fixed portion of the security code is a replacement for a fixed portion of a code stored in a receiver.

7. The method of claim 6, wherein the forming a fixed portion of a security code comprises:

using the version value along with the one or more items of information in forming the fixed portion of the security code.

8. An apparatus for use in relation to a security system, the apparatus comprising:

a memory having a fixed portion of a security code stored therein, wherein the fixed portion of the security code is formed from one or more items of information that individually identify things or users associated with the security system;

a user interface; and a transmitter operably coupled to the first memory and configured to transmit a varying portion of the security code and at least a part of the fixed portion of the security code to a receiving apparatus in response to an assertion of the user interface, wherein the varying portion of the security code is configured to be used by the receiving apparatus to determine whether to effect operation of the receiving apparatus and permit access to a secured area, wherein at least a portion of the fixed portion of the security code is configured to effect at least two different replacement decisions at the receiving apparatus based on a form of the at least a portion of the fixed portion of the security code, wherein a first form of the at least a portion of the fixed portion of the security code is configured to effect the receiving apparatus to add the fixed portion to a learned list of fixed portions corresponding to authorized transmitters, and wherein a second form of the at least a portion of the fixed portion of the security code is configured to effect the receiving apparatus to add the fixed portion to the learned list of fixed portions corresponding to authorized transmitters while erasing a corresponding previously learned fixed portion.

9. The apparatus of claim 8, wherein the one or more items of information each comprise information related to one or more of a structure, building, location, community, address, street, vehicle, user, and door associated with the security system.

10. The apparatus of claim 8, wherein the fixed portion of the security code is formed by encrypting the one or more items of information.

11. The apparatus of claim 8, wherein the memory includes the varying portion of the security code stored therein, the varying portion comprising a rolling code, and the transmitter is further configured to transmit both the fixed portion and the rolling code of the security code.

12. The apparatus of claim 8, wherein the fixed portion of the security code further comprises a version value for use in determining whether the fixed portion of the security code is a replacement for a fixed portion of a code stored in a receiver.

13. A method for use in relation to a security system, the method comprising:

receiving a transmitted code having a varying portion and a fixed portion, wherein the fixed portion of the transmitted code is formed from one or more items of information that individually identify things or users associated with the security system, and wherein at least a portion of the fixed portion of the transmitted code is configured to effect at least two different replacement decisions;

determining whether to effect operation of a receiving apparatus based on the varying portion of the transmitted code;

identifying a stored code having a fixed portion that matches the fixed portion of the transmitted code; and in response to the identification of a stored code having a fixed portion that matches the fixed portion of the transmitted code:

generating an authorization signal, and effecting a replacement decision based on a form of the at least a portion of the fixed portion of the transmitted code, wherein a first form of the at least a portion of the fixed portion of the transmitted code is configured to effect the receiving apparatus to add the fixed portion to a learned list of fixed portions corresponding to authorized transmitters, and wherein a second form of the at least a portion of the fixed portion of the transmitted code is configured to effect the receiving apparatus to add the fixed portion to the learned list of fixed portions corresponding to authorized transmitters while erasing a corresponding previously learned fixed portion.

14. The method of claim 13, wherein the one or more items of information each comprise information related to one or more of a structure, building, location, community, address, street, vehicle, user, and door associated with the security system.

15. The method of claim 13, wherein the fixed portion of the transmitted code comprises an encryption of the one or more items of information.

16. The method of claim 13, wherein the varying portion of the transmitted code comprises a rolling code.

17. The method of claim 13, wherein the fixed portion of the transmitted code further comprises a version value for use in determining whether the fixed portion of the transmitted code is a replacement for the fixed portion of the stored code.

18. An apparatus for use in relation to a security system, the apparatus comprising:

a memory having one or more codes stored therein;

a receiver configured to receive a transmitted code having a varying portion and a fixed portion, wherein the fixed portion of the transmitted code is formed from one or more items of information that individually identify things or users associated with the security system and wherein at least a portion of the fixed portion of the transmitted code is configured to effect at least two different replacement decisions; and a controller operably coupled to the memory and to the receiver and configured to:

determine whether to operate a receiving apparatus based on the varying portion of the transmitted code;

identify a stored code having a fixed portion that matches the fixed portion of the transmitted code, generate an authorization signal in response to the identification of a stored code having a fixed portion that matches the fixed portion of the transmitted code, and effect a replacement decision based on a form of the at least a portion of the fixed portion of the transmitted code, wherein a first form of the at least a portion of the fixed portion of the transmitted code is configured to effect the receiving apparatus to add the fixed portion to a learned list of fixed portions corresponding to authorized transmitters, and wherein a second form of the at least a portion of the fixed portion of the transmitted code is configured to effect the receiving apparatus to add the fixed portion to the learned list of fixed portions corresponding to authorized transmitters while erasing a corresponding previously learned fixed portion.

19. The apparatus of claim 18, wherein the one or more items of information each comprise information related to one or more of a structure, building, location, community, address, street, vehicle, user, and door associated with the security system.

20. The apparatus of claim 18, wherein the fixed portion of the transmitted code comprises an encryption of the one or more items of information.

21. The apparatus of claim 18, wherein the varying portion of the transmitted code comprises a rolling code.

22. The apparatus of claim 18, wherein the fixed portion of the transmitted code further comprises a version value for use in determining whether the fixed portion of the transmitted code is a replacement for the fixed portion of the stored code.

23. A method for use in relation to a security system, the method comprising:

generating a fixed portion of a security code, the security code configured to effect access to a secured area, and at least a portion of the fixed portion of the security code configured to effect at least two different replacement decisions;

setting a value of the fixed portion of the security code to a value that has a relationship to a fixed portion of a previously learned security code, wherein the relationship indicates that the fixed portion of the security code is a replacement for the fixed portion of the previously learned security code sufficient to effect a receiving apparatus that receives the security code to effect a replacement decision based on the relationship, wherein a first form of the at least a portion of the fixed portion of the security code is configured to effect the receiving apparatus to add the fixed portion to a learned list of fixed portions corresponding to authorized transmitters, and wherein a second form of the at least a portion of the fixed portion of the security code is configured to effect the receiving apparatus to add the fixed portion to the learned list of fixed portions corresponding to authorized transmitters while erasing a corresponding previously learned fixed portion, and storing the fixed portion of the security code in an apparatus that is configured to transmit the fixed portion of the security code together with a variable portion of the security code, wherein the variable portion of the security code is configured to be used by the receiving apparatus to determine whether to permit access to the secured area.

24. The method of claim 23, wherein the setting a value of the fixed portion of the security code to a value that has a relationship to a fixed portion of a previously learned security code comprises:

setting a value of a first part of the fixed portion of the security code equal to a first part of the fixed portion of the previously learned security code.

25. The method of claim 24, wherein the setting a value of the fixed portion of the security code to a value that has a relationship to a fixed portion of a previously learned security code further comprises:

setting a value of a second part of the fixed portion of the security code equal to a value that indicates the fixed portion of the security code is a new version of the fixed portion of the previously learned security code.

26. The method of claim 25, wherein the setting a value of the fixed portion of the security code to a value that has a relationship to a fixed portion of a previously learned security code further comprises:

setting the value of the second part of the fixed portion of the security code equal to an incremented value of a second part of the fixed portion of the previously learned security code.

27. The method of claim 25, wherein the setting a value of the fixed portion of the security code to a value that has a relationship to a fixed portion of a previously learned security code further comprises:

setting one or more bit values in the second part of the fixed portion of the security code to indicate that at least a fixed portion of all previously learned codes should be removed from storage.

28. The method of claim 23, wherein the relationship further indicates that the fixed portion of the security code should be stored and the fixed portion of the previously learned security code should be removed from storage.

29. The method of claim 23, wherein the variable portion of the security code includes a rolling code.

30. An apparatus for use in relation to a security system, the apparatus comprising:

a memory having a fixed portion of a security code stored therein, at least a portion of the fixed portion of the security code configured to effect at least two different replacement decisions, wherein the fixed portion of the security code has a value that has a relationship to a fixed portion of a previously learned security code, and wherein the relationship indicates that the fixed portion of the security code is a replacement for the fixed portion of the previously learned security code sufficient to effect a receiving apparatus that receives the security code to effect a replacement decision based on the relationship, wherein a first form of the at least a portion of the fixed portion of the security code is configured to effect the receiving apparatus to add the fixed portion to a learned list of fixed portions corresponding to authorized transmitters, and wherein a second form of the at least a portion of the fixed portion of the security code is configured to effect the receiving apparatus to add the fixed portion to the learned list of fixed portions corresponding to authorized transmitters while erasing a corresponding previously learned fixed portion, and a transmitter operably coupled to the memory and configured to transmit at least a part of the fixed portion of the security code and a varying portion of the security code to a receiving apparatus, with the varying portion of the security code being configured to be used by the receiving apparatus to determine whether to effect access to a secured area.

31. The apparatus of claim 30, wherein the fixed portion of the security code includes a first part having a value that is equal to a first part of the fixed portion of the previously learned security code.

32. The apparatus of claim 31, wherein the fixed portion of the security code includes a second part having a value that indicates the fixed portion of the security code is a new version of the fixed portion of the previously learned security code.

33. The apparatus of claim 32, wherein the second part of the fixed portion of the security code includes one or more bit values that are set to indicate that at least a fixed portion of all previously learned codes should be removed from storage.

34. The apparatus of claim 30, wherein the relationship further indicates that the fixed portion of the security code should be stored and the fixed portion of the previously learned security code should be removed from storage.

35. A method for use in relation to a security system, the method comprising:

storing one or more codes;

receiving a transmitted code having a varying portion and a fixed portion with the fixed portion including a first part and a second part, wherein at least a portion of the fixed portion of the transmitted code is configured to effect at least two different replacement decisions;

determining whether to effect operation of a receiving apparatus based on the varying portion of the transmitted code;

identifying a stored code having a fixed portion with a first part thereof that matches the first part of the fixed portion of the transmitted code;

determining whether the fixed portion of the transmitted code is a replacement for the fixed portion of the stored code by comparing the second part of the fixed portion of the transmitted code with a second part of the fixed portion of the stored code; and based on the comparing of the second part of the fixed portion of the transmitted code to the second part for the fixed portion of the stored code, effecting an authorization signal and making a replacement decision, wherein a first form of the at least a portion of the fixed portion of the transmitted code is configured to effect the receiving apparatus to store the fixed portion to a learned list of fixed portions corresponding to authorized transmitters, and wherein a second form of the at least a portion of the fixed portion of the transmitted code is configured to effect the receiving apparatus to store the fixed portion to the learned list of fixed portions corresponding to authorized transmitters while erasing a corresponding previously learned fixed portion.

36. The method of claim 35, wherein the determining whether the fixed portion of the transmitted code is a replacement for the fixed portion of the stored code further comprises:

determining whether a value included in the second part of the fixed portion of the transmitted code is an incremented value of a value included in the second part of the fixed portion of the stored code.

37. An apparatus for use in relation to a security system, the apparatus comprising:

a memory having one or more codes stored therein;

a receiver configured to receive a transmitted code having a varying portion and a fixed portion with the fixed portion including a first part and a second part, wherein at least a portion of the fixed portion of the transmitted code is configured to effect at least two different replacement decisions; and a controller operably coupled to the memory and to the receiver and configured to:

determine whether to effect operation of a receiving apparatus based on the varying portion of the transmitted code;

identify a stored code having a fixed portion with a first part thereof that matches the first part of the fixed portion of the transmitted code, determine whether the fixed portion of the transmitted code is a replacement for the fixed portion of the stored code by comparing the second part of the fixed portion of the transmitted code with a second part of the fixed portion of the stored code, and based on the comparing of the second part of the fixed portion of the transmitted code to the second part for the fixed portion of the stored code, effect an authorization signal and make a replacement decision, wherein a first form of the at least a portion of the fixed portion of the transmitted code is configured to effect the receiving apparatus to store the fixed portion to a learned list of fixed portions corresponding to authorized transmitters, and wherein a second form of the at least a portion of the fixed portion of the transmitted code is configured to effect the receiving apparatus to store the fixed portion to the learned list of fixed portions corresponding to authorized transmitters while erasing a corresponding previously learned fixed portion.

38. The apparatus of claim 37, wherein the controller is further configured to determine whether a value included in the second part of the fixed portion of the transmitted code is an incremented value of a value included in the second part of the fixed portion of the stored code.

39. The method of claim 1, wherein a third form of the at least a portion of the fixed portion of the security code is configured to effect the receiving apparatus to add the fixed portion to the learned list of fixed portions corresponding to authorized transmitters while erasing other fixed portions on the learned list.

40. The apparatus of claim 8, wherein a third form of the at least a portion of the fixed portion of the security code is configured to effect the receiving apparatus to add the fixed portion to the learned list of fixed portions corresponding to authorized transmitters while erasing other fixed portions on the learned list.

41. The method of claim 13, wherein a third form of the at least a portion of the fixed portion of the transmitted code is configured to effect the receiving apparatus to add the fixed portion to the learned list of fixed portions corresponding to authorized transmitters while erasing other fixed portions on the learned list.

42. The apparatus of claim 18, wherein a third form of the at least a portion of the fixed portion of the transmitted code is configured to effect the receiving apparatus to add the fixed portion to the learned list of fixed portions corresponding to authorized transmitters while erasing other fixed portions on the learned list.

43. The method of claim 23, wherein a third form of the at least a portion of the fixed portion of the security code is configured to effect the receiving apparatus to add the fixed portion to the learned list of fixed portions corresponding to authorized transmitters while erasing other fixed portions on the learned list.

44. The apparatus of claim 30, wherein a third form of the at least a portion of the fixed portion of the security code is configured to effect the receiving apparatus to add the fixed portion to the learned list of fixed portions corresponding to authorized transmitters while erasing other fixed portions on the learned list.

45. The method of claim 35, wherein a third form of the at least a portion of the fixed portion of the transmitted code is configured to effect the receiving apparatus to store the fixed portion to the learned list of fixed portions corresponding to authorized transmitters while erasing other fixed portions on the learned list.

46. The apparatus of claim 37, wherein a third form of the at least a portion of the fixed portion of the transmitted code is configured to effect the receiving apparatus to store the fixed portion to the learned list of fixed portions corresponding to authorized transmitters while erasing other fixed portions on the learned list.

* * * * *